United States Patent [19]
Smith

[11] 4,192,097
[45] * Mar. 11, 1980

[54] HORTICULTURAL IMPROVEMENTS

[76] Inventor: Walton J. Smith, P.O. Box 461, Wilton, Conn. 06897

[ * ] Notice: The portion of the term of this patent subsequent to Aug. 15, 1995, has been disclaimed.

[21] Appl. No.: 913,445

[22] Filed: Jun. 7, 1978

Related U.S. Application Data

[63] Continuation of Ser. No. 811,315, Jun. 29, 1977, abandoned, which is a continuation of Ser. No. 715,503, Aug. 18, 1976, abandoned, which is a continuation of Ser. No. 571,866, Apr. 25, 1975, abandoned.

[51] Int. Cl.² .............................................. A01G 31/00
[52] U.S. Cl. ............................................ 47/59; 47/66
[58] Field of Search .................... 47/59, 66, 73, 79–80

[56] References Cited

U.S. PATENT DOCUMENTS

| 2,231,300 | 2/1941 | Shockney | 47/80 |
| 2,713,749 | 7/1955 | Hult | 47/59 |

FOREIGN PATENT DOCUMENTS

| 1080204 | 12/1954 | France | 47/59 |
| 284290 | 11/1952 | Switzerland | 47/59 |

*Primary Examiner*—Robert E. Bagwill
*Attorney, Agent, or Firm*—Larson, Taylor and Hinds

[57] ABSTRACT

A portable flower pot for house plants which is essentially open at the bottom, the bottom of which is in the form of a grid or a screen, said bottom prior to adding the growing medium being at least 35% open and preferably at least 75% open, said grid or screen having openings at least 1/36" and smaller than about ⅛" in the largest dimensions.

1 Claim, 2 Drawing Figures

HORTICULTURAL IMPROVEMENTS

This is a continuation of application Ser. No. 811,315, filed June 29, 1977, which was a continuation of application Ser. No. 715,503, filed Aug. 18, 1976, which was a continuation of application Ser. No. 571,866, filed Apr. 25, 1975, all of which were abandoned.

This invention pertains to methods and products for growing plants indoors and outdoors. It pertains more specifically to flower pots for growing plants in small portable pots which I have designated micro-sized pots and macro-sized pots. It pertains to micro-sized pots with upper cross-sections of from 0.2–12 square inches, and macro-sized pots with upper cross-sections of about 13–120 square inches. When round, the micro-sized pots would be ½ to 2 inches in diameter, and the macro-sized pots would be about 2½ to 6″ in diameter at the top.

For decades, and probably centuries, house plants have been grown in clay pots which have a small hole in the bottom usually closed with a rock or piece of a broken clay pot. The pot is filled with soil or a mixture of soil and other growing media. The bottom hole is almost totally closed so that the soil does not pass through it during the watering process. This often results in poor drainage and inadequate aeration, both of which are the most frequent causes of failure to have a healthy plant.

Flower pots of all types including the clay pots are usually placed in shallow trays. Any excess water during the watering of the plant runs into the tray. If the plant is not overwatered or water-soaked and if aeration is adequate, and the plant grows, eventually some roots may creep out of the hole in the bottom despite its almost complete closure. This occurs, in general, only when the plant is "root bound" which refers to the fact that the roots more or less fill the pot and now are looking for further growing space. When the holes in the bottom of pots are closed in this way, roots do not usually pass through the hole unless, as stated, the pot is "root-bound".

I have discovered that if I remove most of the bottom from a flower pot leaving just enough of the bottom to support a screen, many unforseen advantages result. Screens have not previously been used in growing ordinary house plants because it would have been expected that soil would not be retained by the screen. I have discovered that I can use ordinary window screen for this purpose (plastic or preferably aluminum) and that soil mixtures frequently used for growing house plants is adequately retained on the screen despite the fact that the openings in the screen are much larger than the particulate matter in the soil or planting mixture.

One major advantage of the use of a screen on the bottom in these micro and macro pots is the superior drainage, and almost of equal significance is the superior aeration of the roots resulting partly from the superior drainage, but when used in conjunction with a lower vessel whose dimensions at the top are substantially those of the top of the pot, access of the roots to air and oxygen is much improved, as well as drainage.

This invention can be described in greater detail by considering separately the following factors:
 (a) composition of screen
 (b) degree of openness of screen
 (c) porosity of screen
 (d) differentiation with prior art
 (e) composition of growing medium In the accompanying drawings, this invention has been illustrated with certain preferred embodiments.

Figure 1:
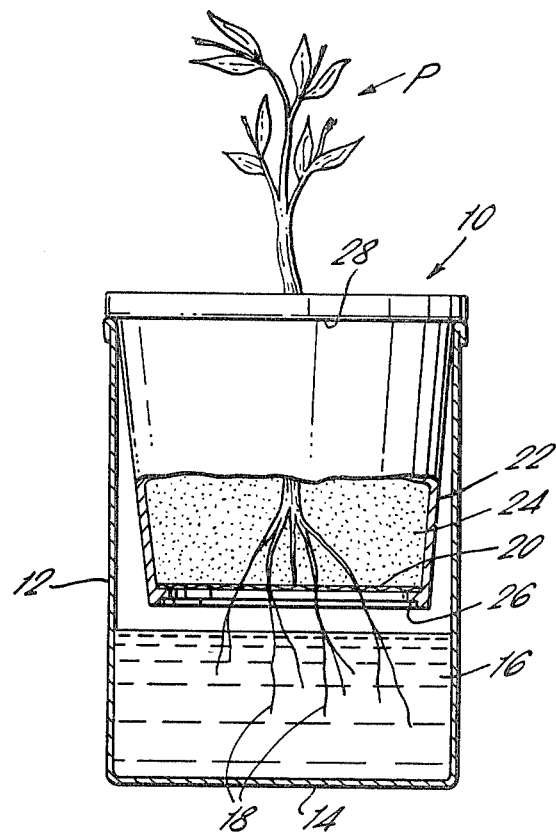
FIG. 1 illustrates the complete assembly in partial cross-section showing a plant in the flower pot which is resting in a lower vessel containing water or nutrient liquid.
Figure 2:
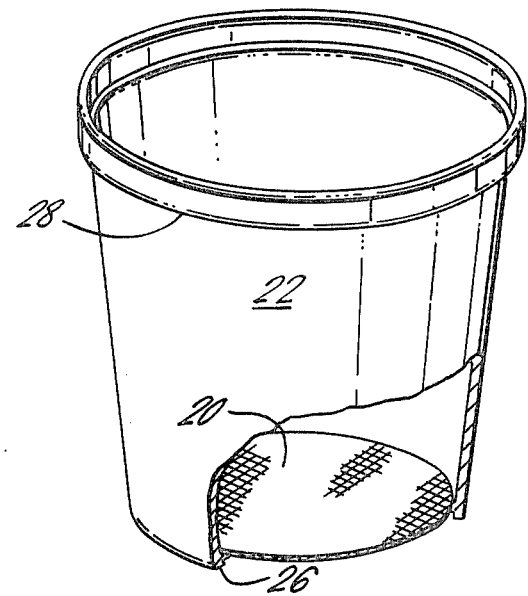
FIG. 2 is a study of the flower pot itself.

In the figures the flower pot, 22, is resting in the flower vessel, 12, held tightly in place by the rim, 28, which is such a dimension that it is larger than the inside dimension of 12. Flower vessel, 12, has a bottom, 14, and contains a nutrient medium, 16. The bottom of the flower pot, 22, is open except for a rim, 26, extending so that a screen, 20, may cover the bottom without falling through. The plant, P, as it develops forms a root system, 18, which develops not only in the flower pot itself but passes through the screen, 20, into the nutrient liquid, 16. The flower pot contains a medium, 24, which holds the plant upright and may supply nutritive elements as well.

COMPOSITION OF THE SCREEN

The screen may be integrated into the bottom of plastic pots, although the preferred form is a screen which is removable. With an upward push from the bottom, the plant may be removed for transplanting without damage to the root system or disturbing the growing medium. While this is no problem to professionals, amateur gardeners would benefit from the advantage of a removable screen.

I have used aluminum screens primarily, though for experimental work I have also used stainless steel screens. Ordinary aluminum screen is the less preferred form because it has a tendency to corrode and probably has some toxicity to the roots, while aluminum screens as is used for window screen is treated in such a way that it resists corrosion and this is the preferred type of removable screen. Plastic is very satisfactory also if the desired degree of openness can be achieved along with proper rigidity of the bottom.

DEGREE OF OPENNESS OF SCREEN

Since even the old-fashioned clay pots in which the hole is covered with a rock has a very small degree of openness, probably less than 1% of the area of the top of the pot.

One of the requirements of this invention is that the screen be essentially open. Ideally, it should be 100% open, but this is not practical since the wires or plastic will occupy some of the space. Other pots described in the prior art have had multiple holes in the bottom of the pot to improve drainage, however, these have not provided the degree of openness required by this invention. The open area prior to putting in soil or other supporting media should be at least 35% of the cross-sectional area at the rim of the flower pot, but I prefer to have the open area as high as possible, usually about 75% of the rim area.

This degree of openness is very important in encouraging the roots to pass through the screen as soon as possible rather than waiting until the plant is root bound.

POROSITY OF SCREEN

In the first place the screen should have adequate porosity so that prior to adding the particulate matter, the open area should be at least 35% of the cross-sectional area at the rim of the flower pot. If the bottom is an integral part of the pot which is formed when the flower pot is formed, the ribs or "wires" should be as small as possible to achieve maximum openness. Aluminum window screen has 18 openings to the inch or about 324 openings to the square inch. While not generally preferred for most plants, one could use 36 openings to the inch or about 1300 openings to the square inch. On the larger size openings, I have used aluminum screen with 1/8" openings or about 64 openings per square inch. It should be stressed that in most cases, the degree of openness is the same and the only thing that has been varied in the above discussion has been the size of the openings.

When integrating the bottom screen into the plastic pot, as a practical matter, some sacrifice in the degree of openness is usually made, but in any case, the total open area should be at least 35% of the top area as stated above. The openings would range from about 1/36" across to about 1/8" across if the openings are uniform.

DIFFERENTIATION WITH PRIOR ART

This refers to the "screen". The main differentiation is that while previous examples of pots with a plurality of openings have been concerned with better drainage, they have not provided the combination of drainage and aeration, along with a degree of openness which I have specified. It is not that there has not been a degree of openness in previous pots, for as stated above, even for the clay pot, there was some openness, but that it is not even close to the same order of magnitude of the present invention.

With the present invention, if it is desired to obtain root growth down through the screen as soon as possible, one need not wait for the plant to be root-bound for this to occur, but in many cases the primary root will head right down through the bottom of the pot as fast as it can grow. In the case of cucumber plants for example, grown in 3" pots in the incubator at 85° F., using the aluminum window screen and a standard "soil" mixture, I have obtained root growth down through the screen within four days. With the pots previously described in the patent literature and elsewhere, this would not have been possible. It will be seen in the description of the use of these "open-bottom" pots with lower vessels containing water, that this feature is of greatest importance.

The patent literature describes a variety of pots with complicated structures, even wires on the bottom to hold pebbles, but none of these would enable the use of typical mixtures used in potting house plants, and at the same time provide maximum aeration and drainage along with the encouragement of root growth beyond the bottom of the pot.

In hydroponics, a screen has been employed, but it has been of extremely wide mesh, namely chicken wire, which in turn holds some excelsior and the like, hence the true bottom is not really the chicken wire but rather the excelsior. Also in fine particulate matter utilization as the growing medium, one could not use the type of upper container used in hydroponics. There is no relationship at all between the upper vessel of hydroponics and the present invention. As a matter of fact, hydroponics only comes to mind when the open bottom type pot is used in conjunction with a lower vessel containing water.

An unpredictable discovery with the use of aluminum window screen has been that roots grow down through the screen with diameters much greater than the screen itself. In other words, the screen can be of small enough porosity that normal soil or fine particulate mixtures can be used without significant loss during watering, yet roots of virtually any size can penetrate the screen. Although one would expect that the maximum root size could be 1/18" through such a screen, I have observed roots with a diameter of up to 1/8" and even larger penetrating such a screen. Obviously, the prior art in which holes have been bored in plastic or molded in plastic, would not offer this option, nor would the root in most cases even be able to find the sparse holes.

COMPOSITION OF THE GROWING MEDIUM

The use of potting mixtures has been described above. This invention resides partially in the finding that fine particulate matter, of which soil can be a component, builds itself up at the small openings of window screen so as to permit a free flow of water and air, yet does not significantly pass through the openings upon watering despite the fact that the particulate matter can be much smaller than the openings. This fine particulate matter may include vermiculite, soil, fine sand, pearlite, lime, humus, and the like.

SUMMARY OF THE INVENTION

This invention provides for a flower pot which is essentially open at the bottom in the form of a grid or a screen, said bottom prior to adding the growing medium being at least 35% open and preferably at least 75% open, said grid or screen having openings at least 1/36" and smaller than about 1/8" in the largest dimensions.

While certain prior art may have a fraction of these embodiments, they do not provide or suggest the composite consisting of providing a satisfactory degree of openness of the screen, the proper porosity of the screen, nor composition of the screen, nor enabling the use of fine particulate matter as the growing medium.

The pots described herein may be round, square, or other shapes. This invention has been described and preferred for micro-sized and macro-sized pots, however, it is recognized that with some modification this invention may be applied to larger pots.

The flower pot need not be completely solid on the sides, but the sides may be partially open and made of a similar grid or screen as the bottom. This permits the roots to grow out of the sides as well as the bottom when it is immersed in a lower container with adequate space on the sides. The sides and the bottom may consist only of a screen with a rim, made of suitable material to hold the screen from falling into its support vessel.

The flower pot need not be traditional in shape. I have found advantages for certain plants for another shape for the pot, and this is one in which the opening at the top is smaller than the diameter at the bottom. I have discovered that the advantage of such a construction is that small plants may be started in larger pots without transplanting because the roots grow downward utilizing the entire pot. In the traditional pot, the root growth expands downward, but the pot narrows to decrease the growing space. This old design has forced growers to start plants in very small pots requiring frequent transplanting. This new concept is applicable to tall kinds of flower pots and is not limited to the objective of a double vessel system in which the roots grow down through the bottom of the screen.

I claim:

1. A flower pot for house plants comprising a portable pot having sides and a bottom and adapted for receipt in a lower vessel containing water for the plant such that the lower vessel is effectively closed to prevent loss of water vapor, the bottom of said pot including support means comprising crossing reinforcing ribs supporting a section of a removable aluminum window screen, said bottom being at least 34% open and holding fine particulate plant-supporting material, the particles of which are finer than the screen openings at least directly on said screen and accomodating a substantial root system, said screen having openings at least 1/36" and smaller than about ⅛" in the largest dimensions.

* * * * *